May 4, 1948.                B. F. HAMMARSTROM                2,440,897
                NON-RESILIENT MOUNTING FOR ELECTRIC MOTORS
                          Filed April 9, 1945
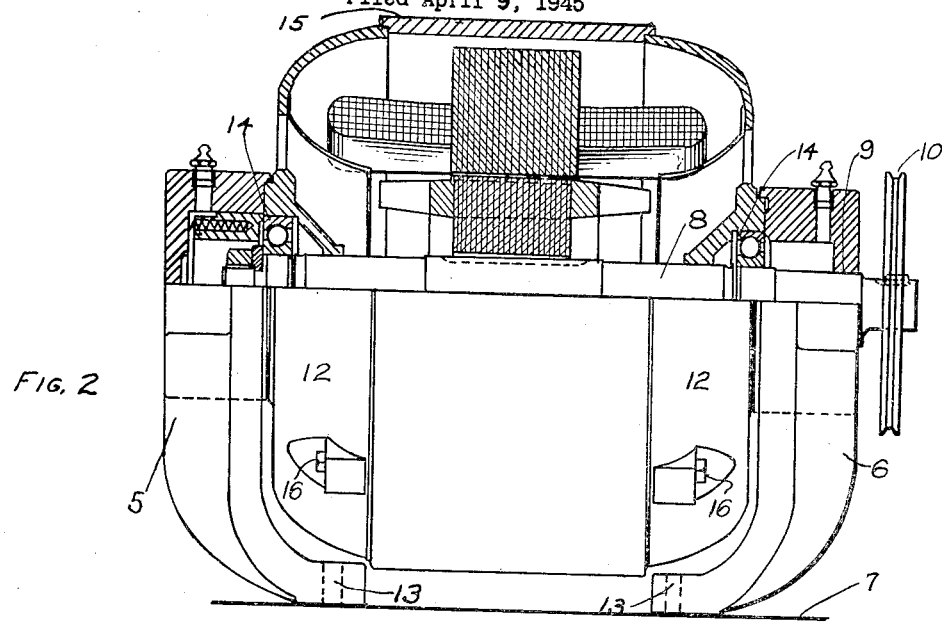
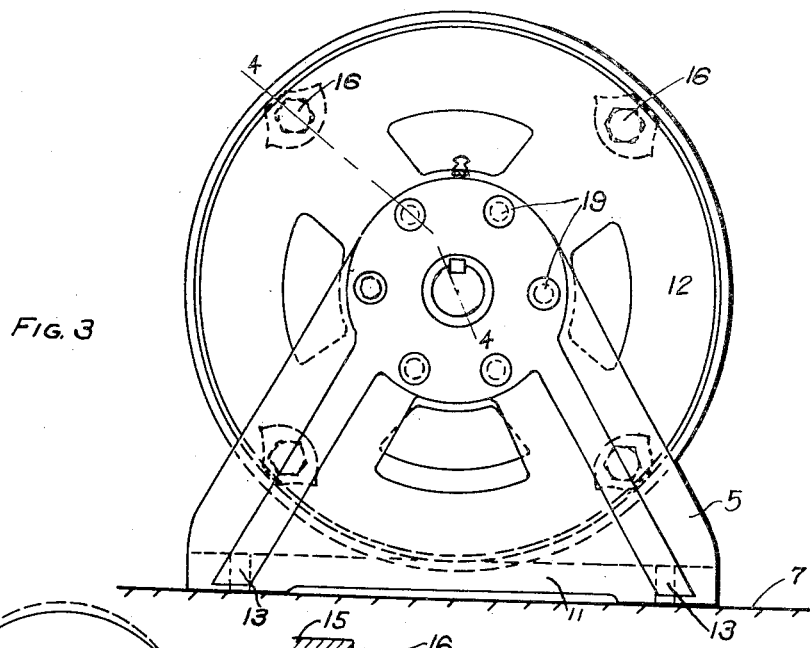
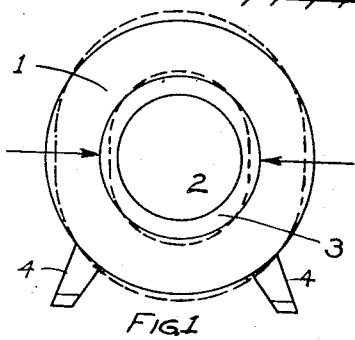
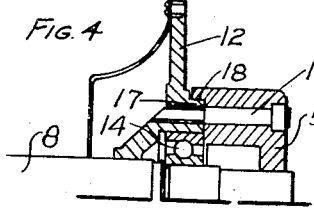
INVENTOR
BERTIL F. HAMMARSTROM
Geo. H. Kennedy
ATTORNEY Patented May 4, 1948

2,440,897

UNITED STATES PATENT OFFICE 2,440,897

NONRESILIENT MOUNTING FOR ELECTRIC MOTORS

Bertil F. Hammarstrom, Worcester, Mass., assignor to The Heald Machine Company, Worcester, Mass., a corporation of Massachusetts Application April 9, 1945, Serial No. 587,355

1 Claim. (Cl. 171—252)

This invention relates to improved mountings or supporting means for electric motors, particularly motors of the polyphase type, having sufficient size and capacity to develop several horsepower.

Objects of the invention are to achieve a stable and rigid mounting for such a motor and to isolate the effects of certain cyclical vibrations of magnetic origin that are set up, as hereinafter described, in the motor's stator and stator frame, and that are ordinarily transmitted through the usual motor feet to the supporting base or floor.

It has long been the practice with small fractional-horsepower single-phase electric motors, to interpose a resilient medium such as rubber, felt or the like, between the motor feet and the base or supporting surface to which such feet are bolted, in order to prevent the transmission to such base of the vibrations, principally rotational or torsional, that result from the pulsating torque of such small, single phase motors. However, all such and similar resilient mountings are totally unsuited to the much larger, heavier motors, usually of polyphase type, which are incorporated, for example, in machine tools and the like, or in other industrial applications for the development of horsepowers of the order of 5 to 10 and above, especially where such a motor is connected by a belt or through gears, to drive the shaft or spindle of a high speed cutting tool or the like; in such an environment, a resilient mounting for the motor is oftentimes worse than useless, since it permits the motor to move about under the stress of driving deflections due to belt pull or gear resistance and thereby sets up a new system of vibration at the natural frequency of the combination which is transmitted by the belt or gears to the tool-carrying or other spindle, thus greatly increasing the tendency of the tool to produce chatter marks on the work being operated upon.

As regards most of these polyphase multiple-horsepower industrial motors, whose weight and size preclude, for the reasons above stated, the use of resilient mountings, I have found that the most objectionable vibrations encountered therein are of magnetic origin and are set up radially in the shell or frame of the stator, whence they are transmitted by the usual motor feet to the base or support and thus to the whole machine, including the motor-driven tool or other element. My invention provides, as hereinafter described, a rigid non-resilient motor mounting that effectively isolates practically all such vibrations; other and further objects and advantages of my invention will be made apparent in the following detailed description thereof, taken in connection with the accompanying illustrative drawings in which Fig. 1 is a diagrammatic view of essential motor elements, illustrating the origin of the aforesaid vibrations. Fig. 2 is a view in side elevation, partly in section, of an electric motor having mounting or supporting means in accordance with my invention. Fig. 3 is an end elevation of the parts shown in Fig. 2, and Fig. 4 is a fragmentary sectional view, the section being taken on the line 4—4 of Fig. 3. Like reference characters refer to like parts in the different figures.

In the diagram of Fig. 1, a series of concentric rings is used, for the sake of simplicity, to represent respectively the stator 1, the rotor 2 and the air gap 3 of a conventional electric motor. It is well known in the operation of an alternating current polyphase induction motor that the magnetic pull around the circumference is constantly changing; in other words, the magnetic field across the air gap, in the case of a two-pole alternating current motor, has two points of maximum field intensity which are 180° apart, and two points of zero intensity midway between. Assuming the field to rotate at a synchronous speed of 60 revolutions per second or 3600 R. P. M., the two maximum points will pass any given point on the stator during each cycle, and at each passing the effect is to exert a strong force tending to close the air gap 3 between the stator 1 and the rotor 2. Thus the stator in the case of such a two-pole motor is continually being subjected by the pull of this rotating magnetic field to an elliptical distortion (shown exaggeratedly by the broken lines in Fig. 1) that travels in a wave around the stator at a rate which is double that of the power frequency; thus if the power frequency is 60 cycles per second the stator will have a vibratory rate, under the influence of this elliptical distortion wave of 120 cycles per second. This rapid vibratory "breathing" of the stator is invariably transmitted by the conventional motor feet shown at 4, 4 in Fig. 1 to the base or other element on which the motor is supported—this, of course, setting up a similar vibration throughout any machine in which the motor is incorporated, with consequent occurrence of chatter marks in any work that is being operated upon by said machine.

As previously pointed out it is not practical with a motor of any considerable weight or size to isolate the above described and other vibrations through the interposition of rubber or other resilient or elastic media between the motor and its supporting base, particularly when such a motor is connected by a belt or by gears to effect the driving of a high speed tool spindle or the like; all such resilient mountings are excluded because they do not give a stable enough support for a large, heavy motor to render the latter immune to the deflecting and shimmying tendencies produced by the heavy pull of a driving belt. I have discovered, however, a simple and effective way to mount such a motor non-resiliently, and at the same time to obtain the virtual isolation of the aforesaid objectionable vibratory effects.

According to my invention the usual and conventional motor feet (see 4, 4, Fig. 1) projecting downwardly from the outer circumference of the stator shell are replaced (see Figs. 2 and 3) by a pair of upright brackets or standards 5 and 6, rising from the level of the base or support 7 to the zone or region of the motor's shaft 8, one of said brackets 6 being apertured as shown at 9 for the passage therethrough of the projecting end of the shaft 8 to which may be keyed a pulley or other driving device 10. Each bracket 5, 6 has the form of a heavy rigid beam, suitably reinforced for stiffness and preferably widening toward its base portion 11, as best shown in Fig. 3, for greater stability. Also, if desired, said base portion may be inturned, as best shown in Fig. 2, so as to underlie the usual end-shields 12, 12 of the motor, thereby to aline the bolt apertures 13, 13 at each end of the base portion with the openings usually provided by the support 7 for the bolting down thereto of the conventional motor feet; this permits my improved mountings to be used for any standard motor from which the usual motor feet have been removed.

The motor shown in Figs. 2 and 3 is of substantially standard construction, with the bearings 14, 14 of its rotor shaft 8, solidly mounted, according to conventional practice, in the end shields 12, 12 of the stator frame or shell, the latter's circumferential portion 15 being suitably secured, as by bolts 16, 16 (Fig. 4) to the end shields, in accordance with standard motor practice.

The supporting brackets 5, 6 are arranged beyond the ends of the motor shell and have no connection therewith, save in the zone or region of the motor axis, i. e. as close as practicable to the center, where the resultant of the equal and opposite distortion forces (see arrows, Fig. 1) is zero. That is, the brackets 5 and 6 are arranged so as to make only a substantially central supporting contact with the motor, the end shields 12, 12 for this purpose being formed with external circular bosses 17, 17 around the bearings 14, 14 which bosses as shown in Fig. 4, are received snugly in corresponding recesses 18, 18 on the inner faces of the brackets 5 and 6. Any suitable means, such as a series of bolts 19, may be employed to establish a solid connection between motor and brackets in this central zone of support, and to prevent any relative turning movement between motor and supporting brackets.

I am aware that it is not new, in mounting or supporting an electric motor, to provide at each end an upright bracket or standard suitably recessed to snugly receive a heavy rubber ring that closely encircles a central portion of the stator shell or frame, in the zone or region of the motor's axis. I make no claim to such known arrangement, which by its use with each bracket of a rubber ring, flexible in torsion, gives opportunity for limited angular movement of the motor relative to said brackets; but what I do claim and desire to secure by Letters Patent of the United States is as follows:

The combination, with an electric motor of alternating current, polyphase induction type having a rotor, a rotor shaft, a stator surrounding said rotor and subject to cyclical radial distortion from the influence of magnetic forces set up by said motor's excitation, opposite end shields rigidly secured to said stator, and bearings in said end shields for said rotor shaft, of non-resilient mounting means for said motor, comprising at each end thereof a rigid stationarily-supported bracket, each bracket making contact with the stator only in the central bearing-containing zone of the adjacent end shield, where the resultant of the magnetic forces tending to distort said stator is substantially zero, and means rigidly and solidly connecting each bracket to its adjacent end shield in said central zone.

BERTIL F. HAMMARSTROM.

REFERENCES CITED

The following references are of record in the file of this patent:

UNITED STATES PATENTS

| Number | Name | Date |
| --- | --- | --- |
| 1,427,859 | Schmidt | Sept. 5, 1922 |
| 1,440,952 | Apple | Jan. 2, 1923 |
| 2,006,727 | Ardrey | July 2, 1935 |
| 2,298,606 | Wren | Oct. 13, 1942 |
| 2,373,497 | Paiste, Jr. | Apr. 10, 1945 |